United States Patent
Sawaguchi et al.

(10) Patent No.: US 10,246,582 B2
(45) Date of Patent: Apr. 2, 2019

(54) RESIN COMPOSITION AND RESIN MOLDED ARTICLE

(71) Applicant: ZEON CORPORATION, Chiyoda-ku, Tokyo (JP)

(72) Inventors: Taichi Sawaguchi, Tokyo (JP); Nozomi Yabuki, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 37 days.

(21) Appl. No.: 15/552,894

(22) PCT Filed: Mar. 3, 2016

(86) PCT No.: PCT/JP2016/056629
§ 371 (c)(1),
(2) Date: Aug. 23, 2017

(87) PCT Pub. No.: WO2016/143668
PCT Pub. Date: Sep. 15, 2016

(65) Prior Publication Data
US 2018/0030260 A1    Feb. 1, 2018

(30) Foreign Application Priority Data

Mar. 6, 2015  (JP) ................................ 2015-044807

(51) Int. Cl.
| | | |
|---|---|---|
| *C08L 45/00* | (2006.01) | |
| *C08L 53/02* | (2006.01) | |
| *C08L 65/00* | (2006.01) | |
| *C08F 232/08* | (2006.01) | |
| *C08J 5/18* | (2006.01) | |
| *C08G 61/08* | (2006.01) | |

(52) U.S. Cl.
CPC ............. *C08L 45/00* (2013.01); *C08F 232/08* (2013.01); *C08G 61/08* (2013.01); *C08J 5/18* (2013.01); *C08L 53/02* (2013.01); *C08L 65/00* (2013.01); *C08G 2261/122* (2013.01); *C08G 2261/418* (2013.01); *C08L 2201/10* (2013.01); *C08L 2205/03* (2013.01)

(58) Field of Classification Search
CPC .......... C08L 45/00; C08L 53/02; C08L 65/00; C08L 53/025; C08L 2201/10; C08L 2205/03; C08G 61/08; C08G 2261/418; C08G 2261/122; C08J 5/18; C08F 232/08; C08F 4/65927; C08F 210/02; C08F 2/06; C08F 230/02; C08F 2500/02; C08F 2500/12

See application file for complete search history.

(56) References Cited

U.S. PATENT DOCUMENTS

| | | | | |
|---|---|---|---|---|
| 2007/0112132 A1* | 5/2007 | Zhao et al. | ............. | C08L 71/12 525/88 |
| 2018/0105689 A1* | 4/2018 | Sawagucji et al. | ..... | C08L 53/02 |

FOREIGN PATENT DOCUMENTS

| | | |
|---|---|---|
| EP | 2930211 A1 | 10/2015 |
| JP | 2004156048 A | 6/2004 |
| JP | 2013203991 A | 10/2013 |
| WO | 2014087935 A1 | 6/2014 |

OTHER PUBLICATIONS

May 24, 2016, International Search Report issued in the International Patent Application No. PCT/JP2016/056629.
Sep. 28, 2018, the Extended European Search Report issued by the European Patent Office in the corresponding European Patent Application No. 16761638.2.

* cited by examiner

*Primary Examiner* — Nathan M Nutter
(74) *Attorney, Agent, or Firm* — Kenja IP Law PC

(57) ABSTRACT

The present invention is a resin composition comprising a cycloolefin resin and at least two hydrogenated styrene-based thermoplastic elastomers, wherein a content of the cycloolefin resin is 50 to 90 wt % based on a total amount of the cycloolefin resin and the hydrogenated styrene-based thermoplastic elastomers, and a melt volume rate of the resin composition at 260° C. is higher than that of the cycloolefin resin at 260° C., and a resin formed article. One aspect of the invention provides a resin composition that exhibits excellent transparency, impact resistance and melt fluidity, as well as a resin formed article obtained by forming this resin composition. The resin formed article of the present invention is preferably used as a drug container, a medical instrument or the like, since it exhibits excellent transparency and impact resistance.

4 Claims, No Drawings

RESIN COMPOSITION AND RESIN MOLDED ARTICLE

TECHNICAL FIELD

The present invention relates to a resin composition that exhibits excellent transparency, impact resistance and melt fluidity, and to a resin formed article obtained by forming this resin composition.

BACKGROUND ART

In recent years, cycloolefin resins have been broadly utilized as forming materials or the like for resin formed articles such as drug containers and medical instruments since they exhibit excellent transparency, low hygroscopicity, excellent heat resistance, excellent chemical resistance, and the like.

However, since the cycloolefin resin normally has high rigidity, conventional cycloolefin resin product exhibited inferior impact resistance and inferior durability against a steam sterilization treatment in some cases.

In order to solve the above problem, methods in which a cycloolefin resin and a styrene-based elastomer are used in combination to give a resin composition having more excellent toughness have been proposed.

For example, Patent Literature 1 describes a film that is obtained by thinning a resin composition that includes a cycloolefin resin and a styrene-based elastomer. In addition, the literature also states that the resulting resin formed article exhibits excellent transparency, impact resistance, and the like.

However, when the toughness was improved by adding a styrene-based elastomer to the cycloolefin resin, transparency originally included in the cycloolefin resin is decreased in some cases. In addition, the resulting resin composition had a tendency to exhibit decreased melt fluidity and poor formability.

CITATION LIST

Patent Literature

Patent Literature 1: JP-A-2004-156048

SUMMARY OF INVENTION

Technical Problem

The invention was conceived in view of the above situation, and an object of the invention is to provide a resin composition that exhibits excellent transparency, impact resistance, and melt fluidity, as well as a resin formed article obtained by forming this resin composition.

Solution to Problem

In order to solve the above problem, the inventors conducted extensive studies with regard to a resin composition that includes a cycloolefin resin and a styrene-based thermoplastic elastomer. As a result, the inventors found that a resin composition that is excellent in all of transparency, impact resistance and melt fluidity was obtained by appropriately combining a cycloolefin resin with at least two hydrogenated styrene-based thermoplastic elastomers. This finding has led to the completion of the invention.

Thus, one aspect of the invention provides the following resin compositions (1) to (3) and resin formed article (4).

(1) A resin composition including a cycloolefin resin and at least two hydrogenated styrene-based thermoplastic elastomers, wherein a content of the cycloolefin resin is 50 to 90 wt % based on a total amount of the cycloolefin resin and the hydrogenated styrene-based thermoplastic elastomers, and a melt volume rate of the resin composition at 260° C. is higher than that of the cycloolefin resin at 260° C.

(2) The resin composition according to (1), wherein both weight average molecular weights of the hydrogenated styrene-based thermoplastic elastomers are 40,000 or less.

(3) The resin composition according to (1) or (2), wherein a difference ($\Delta$nD) between a refractive index of the cycloolefin resin (nD1) and an average of refractive indexes of the hydrogenated styrene-based thermoplastic c elastomers (nD2) is more than −0.002 to less than +0.002.

(4) A resin formed article obtained by forming the resin composition according to any of (1) to (3).

Advantageous Effects of Invention

One aspect of the invention provides a resin composition that exhibits excellent transparency, impact resistance and melt fluidity, as well as a resin formed article obtained by forming this resin composition.

The resin formed article of the present invention is preferably used as a drug container, a medical instrument or the like, since it exhibits excellent transparency and impact resistance.

DESCRIPTION OF EMBODIMENTS

The resin composition according to one embodiment of the invention is a resin composition including a cycloolefin resin and at least two hydrogenated styrene-based thermoplastic elastomers, wherein a content of the cycloolefin resin is 50 to 90 wt % based on a total amount of the cycloolefin resin and the hydrogenated styrene-based thermoplastic elastomers, and a melt volume rate of the resin composition at 260° C. is higher than that of the cycloolefin resin at 260° C.

[Cycloolefin Resin]

The cycloolefin resin used in connection with one embodiment of the invention is a polymer that has an alicyclic structure in the molecule, and is obtained by polymerizing a cycloolefin monomer, or a hydrogenated product thereof.

Examples of the alicyclic structure included in the cycloolefin resin include a cycloalkane structure and a cycloalkene structure. It is preferable that the alicyclic structure included in the cycloolefin resin be a cycloalkane structure since a resin formed article that exhibits excellent transparency, light resistance, durability, and the like is easily obtained. The number of carbon atoms included in the alicyclic structure is not particularly limited, but is normally 4 to 30, preferably 5 to 20, and still more preferably 5 to 15.

Examples of the cycloolefin resin used in connection with one embodiment of the invention include a ring-opening polymer of a cycloolefin monomer (hereinafter may be referred to as "polymer (α)"), a hydrogenated product thereof, an addition polymer produced using a cycloolefin monomer (hereinafter may be referred to as "polymer (β)"), a hydrogenated product thereof, and the like.

As mentioned below, a hydrogenated product of the polymer (α) is preferable as the cycloolefin resin since it exhibits excellent properties in a well-balanced manner, and the desired resin formed article is easily obtained.

(1) Polymer (α) and Hydrogenated Product Thereof

The cycloolefin monomer that is used to produce the polymer (α) and a hydrogenated product thereof is a compound that has a cyclic structure formed by carbon atoms and includes a carbon-carbon double bond in the ring. Specific examples of the cycloolefin monomer include a norbornene-based monomer and the like. In addition, when the polymer (α) is a copolymer, a monocyclic olefin may be used as the cycloolefin monomer.

The term "norbornene-based monomer" used herein refers to a monomer that includes a norbornene ring.

Examples of the norbornene-based monomer include a bicyclic monomer such as bicyclo[2.2.1]hept-2-ene (trivial name: norbornene), 5-ethylidenebicyclo[2.2.1]hept-2-ene (trivial name: ethylidenenorbornene) and a derivative thereof (that includes a substituent on a ring);

a tricyclic monomer such as tricyclo[4.3.0.1$^{2,5}$]deca-3,7-diene (trivial name: dicyclopentadiene) and a derivative thereof;

a tetracyclic monomer such as 7,8-benzotricyclo[4.3.0.1$^{2,5}$]deca-3-ene (trivial name: methanotetrahydrofluorene, also referred to as "tetracyclo[7.4.0.0$^{2,7}$.1$^{10,13}$]trideca-2,4,6,11-tetraene) and a derivative thereof, tetracyclo[4.4.0.1$^{2,5}$.1$^{7,10}$]dodeca-3-ene (trivial name: tetracyclododecene), and 8-ethylidenetetracyclo[4.4.0.1$^{2,5}$.1$^{7,10}$]-3-dodecene and a derivative thereof; and the like.

These monomers may be substituted with a substituent at an arbitrary position. Examples of the substituent include an alkyl group such as a methyl group and an ethyl group; an alkenyl group such as a vinyl group; an alkylidene group such as an ethylidene group and a propan-2-ylidene group; an aryl group such as a phenyl group; a hydroxy group; an acid anhydride group; a carboxy group; an alkoxycarbonyl group such as a methoxycarbonyl group; and the like.

Examples of the monocyclic olefin include a cyclic monoolefine such as cyclobutene, cyclopentene, methylcyclopentene, cyclohexene, methylcyclohexene, cycloheptene, and cyclooctene; a cyclic diolefin such as cyclohexadiene, methylcyclohexadiene, cyclooctadiene, methylcyclooctadiene, and phenylcyclooctadiene; and the like.

These cycloolefin monomers may be used either alone or in combination.

When two or more cycloolefin monomers are used, the polymer (α) may be a block copolymer, or may be a random copolymer.

Among these, tricyclo[4.3.0.1$^{2,5}$]deca-3,7-diene, 8-methyl-tetracyclo[4.4.0.1$^{2,5}$.1$^{7,10}$]dodec-3-ene, and tetracyclo[7.4.0.0$^{2,7}$.1$^{10,13}$]trideca-2,4,6,11-tetraene are preferable as the cycloolefin monomer.

The polymer (α) may be produced using a known method that utilizes a metathesis polymerization catalyst.

The metathesis polymerization catalyst is not particularly limited. A known metathesis polymerization catalyst may be used. Examples of the metathesis polymerization catalyst include a catalyst system that includes a halide, a nitrate or an acetylacetone compound of a metal selected from ruthenium, rhodium, palladium, osmium, iridium, platinum, and the like, and a reducing agent; a catalyst system that includes a halide or an acetylacetone compound of a metal selected from titanium, vanadium, zirconium, tungsten and molybdenum, and an organoaluminum compound (promoter); a Schrock-type or Grubbs-type living ring-opening metathesis polymerization catalyst (see JP-A-7-179575, J. Am. Chem. Soc., 1986, 108, p. 733, J. Am. Chem. Soc., 1993, 115, p. 9858, and J. Am. Chem. Soc., 1996, 118, p. 100); and the like.

These metathesis polymerization catalysts may be used either alone or in combination.

The metathesis polymerization catalyst may be used in an appropriate amount taking account of the polymerization conditions and the like. The metathesis polymerization catalyst is normally used in an amount of 0.000001 to 0.1 mol, and preferably 0.00001 to 0.01 mol, based on 1 mol of the cycloolefin monomer.

A linear α-olefin having 4 to 40 carbon atoms such as 1-butene, 1-hexene and 1-decene may be used as a molecular weight modifier when subjecting the cycloolefin monomer to ring-opening polymerization.

The linear α-olefin is normally added in an amount of 0.001 to 0.030 mol, preferably 0.003 to 0.020 mol, and more preferably 0.005 to 0.015 mol, based on 1 mol of the cycloolefin monomer.

The cycloolefin monomer may be subjected to ring-opening polymerization in an organic solvent. The organic solvent is not particularly limited as long as the organic solvent is inert to the polymerization reaction. Examples of the organic solvent include an aromatic hydrocarbon-based solvent such as benzene, toluene and xylene; an aliphatic hydrocarbon-based solvent such as n-pentane, n-hexane and n-heptane; an alicyclic hydrocarbon-based solvent such as cyclohexane, methylcyclohexane, decalin and bicyclononane; a halogenated hydrocarbon-based solvent such as dichloroethane, chlorobenzene, dichlorobenzene and trichlorobenzene; and a mixed solvent that includes two or more solvents among these solvents.

The polymerization temperature is not particularly limited, but is normally –50 to 250° C., preferably –30 to 200° C., and more preferably –20 to 150° C. The polymerization time is appropriately selected taking account of the polymerization conditions, but is normally 30 minutes to 20 hours, and preferably 1 to 10 hours.

A hydrogenated product of the polymer (α) can be obtained by subjecting the polymer (α) produced as described above to a hydrogenation reaction.

The polymer (α) may be subjected to a hydrogenation reaction by bringing the polymer (α) into contact with hydrogen in accordance with an ordinary method in the presence of a hydrogenation catalyst.

The hydrogenation catalyst may be a homogeneous catalyst, or may be a heterogeneous catalyst.

A homogeneous catalyst has an advantage in that it is easily dispersed in a hydrogenation reaction mixture, and thus the amount of catalyst to be added can be reduced. Since a homogeneous catalyst exhibits sufficient activity even when the temperature and the pressure are not increased to a large extent, decomposition and gelation of the polymer (α) and a hydrogenated product thereof do not easily occur. Therefore, a homogeneous catalyst is preferably used from the viewpoint of cost and the quality of the product.

On the other hand, a heterogeneous catalyst has an advantage in that it exhibits particularly excellent activity at a high temperature under high pressure, and thus the polymer (α) can be hydrogenated within a short time. Moreover, a catalyst residue can be efficiently removed after completion of the hydrogenation reaction.

Examples of the homogeneous catalyst include a Wilkinson's complex [chlorotris(triphenylphosphine)rhodium(I)]; a catalyst that includes a combination of a transition metal compound and an alkylmetal compound, such as combinations of cobalt acetate/triethylaluminum, nickel acetylacetonate/triisobutylaluminum, titanocene dichloride/n-butyllithium, zirconocene dichloride/sec-butyllithium and tetrabutoxytitanate/dimethylmagnesium; and the like.

Examples of the heterogeneous catalyst include a catalyst in which a metal such as Ni, Pd, Pt, Ru, and Rh is supported on a support. Particularly, when the amount of impurities in the resulting hydrogenated product is reduced, it is preferable to use an adsorbent such as alumina and diatomaceous earth as the support.

The hydrogenation reaction is normally effected in an organic solvent. The organic solvent is not particularly limited as long as the organic solvent is inert to the hydrogenation reaction. A hydrocarbon-based solvent is normally used as the organic solvent since a hydrocarbon-based solvent can easily dissolve the resulting hydrogenated product. Examples of the hydrocarbon-based solvent include an aromatic hydrocarbon-based solvent such as benzene, toluene and xylene; an aliphatic hydrocarbon-based solvent such as n-pentane, n-hexane and n-heptane; an alicyclic hydrocarbon-based solvent such as cyclohexane, methylcyclohexane, decalin and bicyclononane; and the like.

These organic solvents may be used either alone or in combination of two or more kinds. In addition, a solvent that is used for a ring-opening polymerization reaction is normally also suitable as a solvent for a hydrogenation reaction. Therefore, after the hydrogenation catalyst is added to the ring-opening polymerization reaction mixture, the resulting mixture can be subjected to the hydrogenation reaction.

The hydrogenation rate varies depending on the type of hydrogenation catalyst, and the reaction temperature. Therefore, when the polymer ($\alpha$) includes an aromatic ring, the aromatic ring residual ratio can be controlled by appropriately selecting the hydrogenation catalyst, adjusting the reaction temperature, or the like. For example, the unsaturated bonds of an aromatic ring may be allowed to remain to a certain extent or higher by performing control such as decreasing the reaction temperature, lowering the hydrogen pressure, or reducing the reaction time.

After completion of the hydrogenation reaction, the reaction mixture can be subjected to a treatment such as centrifugation, or filtration to remove a catalyst residue. In addition, a catalyst deactivation agent such as water and alcohol may be used, or an adsorbent such as activated clay and alumina may be added, as required.

(2) Polymer ($\beta$) and Hydrogenated Product Thereof

Examples of the cycloolefin monomer that is used to synthesize the polymer ($\beta$) and a hydrogenated product thereof include those mentioned above in connection with the cycloolefin monomer that is used to synthesize the polymer ($\alpha$).

An additional monomer that is copolymerizable with the cycloolefin monomer may be used as the monomer in combination with the cycloolefin monomer when synthesizing the polymer ($\beta$).

Examples of the additional monomer include an $\alpha$-olefin having 2 to 20 carbon atoms, such as ethylene, propylene, 1-butene, 1-pentene and 1-hexene; an aromatic vinyl compound such as styrene and $\alpha$-methylstyrene; a non-conjugated diene such as 1,4-hexadiene, 4-methyl-1,4-hexadiene, 5-methyl-1,4-hexadiene and 1,7-octadiene; and the like. Among these, an $\alpha$-olefin is preferable, and ethylene is more preferable.

These additional monomers may be used either alone or in combination of two or more kinds.

When subjecting the cycloolefin monomer and the additional monomer to addition copolymerization, the cycloolefin monomer and the additional monomer are normally used in a weight ratio (cycloolefin monomer:additional monomer) of 30:70 to 99:1, preferably 50:50 to 97:3, and more preferably 70:30 to 95:5.

When two or more cycloolefin monomers are used in combination of two or more kinds, or when the cycloolefin monomer and the additional monomer are used in combination, the polymer ($\beta$) may be a block copolymer, or may be a random copolymer.

The polymer ($\beta$) may be synthesized using a known method that utilizes an addition polymerization catalyst.

Examples of the addition polymerization catalyst include a vanadium-based catalyst that is formed using a vanadium compound and an organoaluminum compound, a titanium-based catalyst that is formed using a titanium compound and an organoaluminum compound, a zirconium-based catalyst that is formed using a zirconium complex and an aluminoxane, and the like.

These addition polymerization catalysts may be used either alone or in combination of two or more kinds. The addition polymerization catalyst may be used in an appropriate amount taking account of the polymerization conditions and the like, but is normally used in an amount of 0.000001 to 0.1 mol, and preferably 0.00001 to 0.01 mol, based on 1 mol of the monomer.

The cycloolefin monomer is normally subjected to addition polymerization in an organic solvent. Examples of the organic solvent include those mentioned above in connection with the solvent that is used for subjecting the cycloolefin monomer to ring-opening polymerization.

The polymerization temperature is normally −50 to 250° C., preferably −30 to 200° C., and more preferably −20 to 150° C. The polymerization time is appropriately selected taking account of the polymerization conditions, but is normally 30 minutes to 20 hours, and preferably 1 to 10 hours.

A hydrogenated product of the polymer ($\beta$) can be obtained by subjecting the polymer ($\beta$) produced as described above to a hydrogenation reaction.

The polymer ($\beta$) may be subjected to a hydrogenation reaction in the same manner as mentioned above as a method for hydrogenating the polymer ($\alpha$).

The weight average molecular weight (Mw) of the cycloolefin resin used in the invention is preferably 20,000 to 100,000, and more preferably 25,000 to 80,000. If the weight average molecular weight (Mw) of the cycloolefin resin is too low, the strength of the resin formed article may decrease. On the other hand, if the weight average molecular weight (Mw) of the cycloolefin resin is too high, the formability of the resin composition may decrease.

The molecular weight distribution (Mw/Mn) of the cycloolefin resin is not particularly limited, but is preferably 1 to 5, and more preferably 1 to 4.

When the molecular weight distribution of the cycloolefin resin is within the above range, it is possible to obtain a resin formed article that exhibits sufficient mechanical strength.

The weight average molecular weight (Mw) and the number average molecular weight (Mn) of the cycloolefin resin refer to standard polyisoprene-equivalent values determined by gel permeation chromatography (GPC) using cyclohexane as an eluent.

The refractive index of the cycloolefin resin (nD1) to be used is normally 1.500 to 1.600, and preferably 1.530 to 1.550.

The term "refractive index" used herein refers to a value measured at 25° C. while applying light having a wavelength of 587.6 nm. The refractive index can be measured by the method described in Examples.

As mentioned below, when the refractive index of the cycloolefin resin (nD1) is within the above range, it is possible to easily reduce the difference (ΔnD) between the refractive index of the cycloolefin resin (nD1) and the average refractive index of the hydrogenated styrene-based thermoplastic elastomers (nD2).

The refractive index (nD1) of the cycloolefin resin has a tendency to be affected by the number of rings included in the molecule. For example, a cycloolefin resin having a high refractive index is easily obtained when a monomer that includes a number of rings such as tricyclic monomer and tetracyclic monomer is used as a cycloolefin monomer that is used for synthesis of the cycloolefin resin.

[Hydrogenated Styrene-Based Thermoplastic Elastomer]

The resin composition of the invention includes at least two hydrogenated styrene-based thermoplastic elastomers.

The hydrogenated styrene-based thermoplastic elastomer that is used in the invention (hereinafter, may be referred to as a polymer (γ)) is a thermoplastic elastomer that is a hydrogenated product of a block copolymer that includes a block (A) that includes a repeating unit derived from a styrene-based monomer and a block (B) that includes a repeating unit derived from an additional monomer (hereinafter, may be referred to as polymer (γ')), wherein a part formed by hydrogenating the block (A) functions as a hard segment, and a part formed by hydrogenating the block (B) functions as a soft segment.

The block (A) does not necessarily include only the repeating unit derived from a styrene-based monomer. For example, when part of a monomer used for the preceding reaction has remained unreacted in the reaction system, the block (A) may include a repeating unit derived from a monomer other than a styrene-based monomer. The content of the repeating unit derived from a styrene-based monomer in the block (A) is normally 95 mol % or more, and preferably 99 mol % or more.

Furthermore, the above description also applies to the block (B).

The method for producing the polymer (γ) is not particularly limited. For example, the polymer (γ') can be obtained by successively subjecting a monomer that corresponds to each block to cationic polymerization in an inert solvent using a Lewis acid catalyst and an initiator, and the polymer (γ) can be obtained by subjecting the polymer (γ') to hydrogenation reaction.

Examples of the polymer (γ') include a block (A)-block (B) polymer, a block (A)-block (B)-block (A) polymer, a block (B)-block (A)-block (B) polymer, a block (A)-block (B)-block (C) polymer, a block (A)-block (C)-block (B) polymer, and the like.

Note that the block (C) is a block other than the block (A) and the block (B). In addition, when the polymer (γ') includes a plurality of blocks (A), a plurality of blocks (B) and a plurality of blocks (C), the plurality of blocks (A), the plurality of blocks (B) and the plurality of blocks (C) may respectively be either identical to or different from each other.

The styrene-based monomer that is used to form the block (A) included in the polymer (γ') is a polymerizable aromatic vinyl compound. Examples of the aromatic vinyl compound include styrene; an alkyl-substituted styrene-based monomer such as α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, and 5-t-butyl-2-methylstyrene; a halogen-substituted styrene-based monomer such as 2-chlorostyrene, 3-chlorostyrene, 4-chlorostyrene, 4-bromostyrene, and 2,4-dibromostyrene; a styrene-based monomer that is substituted with a halogen atom and an alkyl group, such as 2-methyl-4,6-dichlorostyrene; vinylnaphthalene; and the like. These styrene-based monomers may be used either alone or in combination of two or more kinds.

Among these, styrene and an alkyl-substituted styrene are preferable, and styrene is particularly preferable, since a resin formed article that exhibits excellent transparency and excellent impact resistance is easily obtained.

The monomer that is used to form the block (B) included in the polymer (γ') is not particularly limited as long as it is a monomer capable of constituting a soft segment of a thermoplastic elastomer, and a known monomer can be used for synthesizing the thermoplastic elastomer. Examples of this monomer include isobutylene; a conjugated diene-based monomer such as 1,3-butadiene, isoprene, 2,3-dimethyl-1,3-butadiene, 1,3-pentadiene, 1,3-hexadiene and 2-chloro-1,3-butadiene; and the like. These monomers may be used either alone or in combination of two or more kinds.

Among these, isobutylene is preferable since a resin formed article that exhibits excellent transparency and excellent impact resistance is easily obtained.

The polymer (γ') normally includes the block (A) (or a plurality of blocks (A)) and the block (B) (or a plurality of blocks (B)) in a weight ratio (block (A):block (B)) of 15:85 to 70:30, and preferably 20:80 to 60:40.

Examples of the block (C) that may be included in the polymer (γ') include a block that includes a repeating unit derived from a monomer such as ethylene; an α-olefin such as propylene and 1-butene; and the like, and a block that is formed by random polymerization of monomers such as a styrene-based monomer, isobutylene, a conjugated diene-based monomer, ethylene and an α-olefin.

When the polymer (γ') includes the block (C), the content of the block (C) in the polymer (γ') is preferably 20 wt % or less, and more preferably 15 wt % or less.

Examples of the Lewis acid catalyst that is used to produce the polymer (γ') include titanium tetrachloride, boron trichloride, boron trifluoride, aluminum chloride, tin tetrachloride, and the like.

Examples of the initiator that is used to produce the polymer (γ') include a compound that includes an alkoxy group, such as bis(2-methoxy-2-propyl)benzene; a compound that includes an acyl group, such as bis(2-acetoxy-2-propyl)benzene; and a compound that includes a halogen atom, such as bis(2-chloro-2-propyl)benzene and p-dicumyl chloride.

These Lewis acids and initiators may be used either alone or in combination of two or more kinds.

The polymer (γ') may be produced in a state in which an amine compound such as triethylamine; an ester compound such as ethyl acetate; an amide compound such as N,N-dimethylacetamide; and the like are present in the reaction system. It is possible to obtain a product having a narrow molecular weight distribution by producing the polymer (γ') in the presence of these compounds.

Examples of the inert solvent used to produce the polymer (γ') include an aliphatic hydrocarbon-based solvent such as n-butane, isobutane, n-pentane and n-hexane; an aromatic hydrocarbon-based solvent such as benzene, toluene and xylene; an alicyclic hydrocarbon-based solvent such as cyclopentane and cyclohexane; a halogenated hydrocarbon-based solvent such as methyl chloride, dichloromethane, chloroform, ethyl chloride, dichloroethane, butyl chloride, and chlorobenzene; and the like.

These solvents may be used either alone or in combination of two or more kinds.

The polymerization temperature is not particularly limited, but is normally −100 to 0° C., and preferably −80 to −30° C. The polymerization time is appropriately selected taking account of the polymerization conditions, but is normally 30 minutes to 20 hours, and preferably 1 to 10 hours.

The polymer (γ') produced as described above can be isolated and purified as required, and be subsequently subjected to a hydrogenation reaction to produce the polymer (γ).

The polymer (γ') can be subjected to a hydrogenation reaction in the same manner as the method described above as a method for hydrogenating the polymer (α).

Specific examples of the polymer (γ) include a hydrogenated product of the polymer (γ') having the block (A) that includes a repeating unit derived from a styrene-based monomer, and a block (B1) that includes a repeating unit derived from isobutylene or a block (B2) that includes a repeating unit derived from a conjugated diene-based monomer, as the block (B). Among them, a hydrogenated product of the polymer (γ') having the block (A) that includes a repeating unit derived from a styrene-based monomer and the block (B1) that includes a repeating unit derived from isobutylene as the block (B) is preferable, since a resin formed article that exhibits various properties that are enhanced in a well-balanced manner is easily obtained when the hydrogenated product of the polymer (γ') is mixed with the cycloolefin resin to prepare a resin composition.

The weight average molecular weight (Mw) of the polymer (γ) is preferably 40,000 or less, more preferably 15,000 to 40,000, and even more preferably 20,000 to 40,000. When the polymer (γ) having a weight average molecular weight (Mw) of 40,000 or less is used, a resin composition that exhibits excellent melt fluidity can be easily produced.

Note that, from the viewpoint of this effect, at least one of the polymers (γ) to be used has only to have the above-described preferable weight average molecular weights, but it is preferable that all of the polymers (γ) have any of the above-described preferable weight average molecular weights.

The weight average molecular weight (Mw) of the polymer (γ) can be controlled by regulating the amount of the initiator to be used.

The molecular weight distribution (Mw/Mn) of the polymer (γ) is not particularly limited, but is preferably 1 to 5, and more preferably 1 to 4.

When the molecular weight distribution of the polymer (γ) is within the above range, it is possible to obtain a resin formed article that exhibits sufficient mechanical strength.

The weight average molecular weight (Mw) and the number average molecular weight (Mn) of the polymer (γ) refer to standard polyisoprene-equivalent values determined by gel permeation chromatography (GPC) using cyclohexane as an eluent.

The refractive index of the polymer (γ) to be used is normally 1.450 to 1.650, and preferably 1.490 to 1.550.

In addition, the average refractive index (nD2) of the polymer (γ) is 1.500 to 1.600, and preferably 1.530 to 1.550.

The refractive index of the polymer (γ) can be determined by the method described in Examples. In addition, the average refractive index (nD2) of the polymer (γ) is calculated by the following expression.

Average refractive index (nD2) of polymer (γ)=[refractive index of polymer (γ¹)]×[weight ratio of polymer (γ¹) to whole polymers (γ)]+[refractive index of polymer (γ²)]×[weight ratio of polymer (γ²) to whole polymers (γ)] . . . +[refractive index of polymer (γⁿ)]×[weight ratio of polymer (γⁿ) to whole polymers (γ)]   [Equation 1]

As mentioned below, when the average refractive index of the polymer (γ) (nD2) is within the above range, it is possible to more easily reduce the difference (ΔnD) between the refractive index of the cycloolefin resin (nD1) and the average refractive index of the polymers (γ) (nD2).

The refractive index of the polymer (γ) has a tendency of being affected by the amount of repeating unit derived from a styrene-based monomer and the hydrogenation rate. For example, a polymer (γ) having a high refractive index is easily obtained by increasing the amount of repeating unit derived from a styrene-based monomer, and increasing the hydrogenation rate.

[Resin Composition]

The resin composition of the invention includes the cycloolefin resin, and at least 2, preferably 2 to 4, more preferably 2 or 3 of the hydrogenated styrene-based thermoplastic elastomers.

The content of the cycloolefin resin is 50 to 90 wt %, and preferably 70 to 90 wt %, based on the total of the cycloolefin resin and the hydrogenated styrene-based thermoplastic elastomer.

The resin composition including a large amount of the hydrogenated styrene-based thermoplastic elastomer has a tendency of having excellent impact resistance, and the resin composition including a large amount of the cycloolefin resin has excellent transparency.

The resin composition used in connection with one embodiment of the invention may include an additional component such as an additive as long as the advantageous effects of the invention are not impaired.

Examples of the additional component include an antioxidant, a UV absorber, a light stabilizer, a near-infrared absorber, a plasticizer, an antistatic agent, an acid scavenger, and the like.

Examples of the antioxidant include a phenol-based antioxidant, a phosphorus-based antioxidant, a sulfur-based antioxidant, and the like.

Examples of the phenol-based antioxidant include 3,5-di-t-butyl-4-hydroxytoluene, dibutylhydroxytoluene, 2,2'-methylenebis(6-t-butyl-4-methylphenol), 4,4'-butylidenebis(3-t-butyl-3-methylphenol), 4,4'-thiobis(6-t-butyl-3-methylphenol), α-tocopherol, 2,2,4-trimethyl-6-hydroxy-7-t-butylchroman, tetrakis[methylene-3-(3',5'-di-t-butyl-4'-hydroxyphenyl)propionate]methane, {pentaerythritol tetrakis[3-(3,5-di-t-butyl-4-hydroxyphenyl)propionate]}, and the like.

Examples of the phosphorus-based antioxidant include distearylpentaerythritol diphosphite, bis(2,4-di-t-butylphenyl)pentaerythritol diphosphite, tris(2,4-di-t-butylphenyl) phosphite, tetrakis(2,4-di-t-butylphenyl)-4,4'-biphenyl diphosphite, trinonylphenyl phosphite, and the like.

Examples of the sulfur-based antioxidant include distearyl thiodipropionate, dilauryl thiodipropionate, and the like.

Examples of the UV absorber include a benzotriazole-based UV absorber, a benzoate-based UV absorber, a benzophenone-based UV absorber, an acrylate-based UV absorber, a metal complex-based UV absorber, and the like.

Examples of the light stabilizer include a hindered amine-based light stabilizer.

Examples of the near-infrared absorber include a cyanine-based near-infrared absorber; a pyrylium-based infrared absorber; a squarylium-based near-infrared absorber; a croconium-based infrared absorber; an azulenium-based near-infrared absorber; a phthalocyanine-based near-infrared absorber; a dithiol metal complex-based near-infrared absorber; a naphthoquinone-based near-infrared absorber; an anthraquinone-based near-infrared absorber; an indophenol-based near-infrared absorber; an azide-based near-infrared absorber; and the like.

Examples of the plasticizer include a phosphoric acid triester-based plasticizer, a fatty acid monobasic acid ester-based plasticizer, a dihydric alcohol ester-based plasticizer, an oxy acid ester-based plasticizer, and the like.

Examples of the antistatic agent include a fatty acid ester of a polyhydric alcohol, and the like.

Examples of the acid scavenger include magnesium oxide, zinc stearate, and the like.

The content of each of these components may be appropriately determined taking account of the object. The content is normally within a range of 0.001 to 5 parts by weight, and preferably 0.01 to 1 part by weight, based on 100 parts by weight of the cycloolefin resin and the hydrogenated styrene-based thermoplastic elastomer in total.

The resin composition used in connection with one embodiment of the invention may be prepared by mixing the components in accordance with an ordinary method. As the mixing method, the components may be mixed in an appropriate solvent, or may be kneaded in a molten state.

The components may be kneaded using a melt mixer such as a single-screw extruder, a twin-screw extruder, a Banbury mixer, a kneader and a feeder ruder. The kneading temperature is preferably 200 to 400° C., and more preferably 240 to 350° C. The components may be kneaded after adding the components at a time, or may be kneaded while adding the components stepwise.

After kneading, the resulting mixture may be extruded in the shape of a rod in accordance with an ordinary method, and cut using a strand cutter to have an appropriate length, whereby pelletization can be carried out.

A melt volume rate of the resin composition according to one embodiment of the invention at 260° C. is higher than that of the cycloolefin resin constituting the resin composition at 260° C.

That is, for the resin composition according to one embodiment of the invention, the melt fluidity is enhanced by adding at least two hydrogenated styrene-based thermoplastic elastomers to the cycloolefin resin.

The melt volume rate of the cycloolefin resin measured at a load of 21.18 N, at 260° C. is preferably 0.1 to 50 mL/minutes, and more preferably 1 to 30 mL/minutes.

In addition, the melt volume rate of the resin composition according to one embodiment of the invention measured at a load of 21.18 N, at 260° C. is preferably 10 to 100 mL/minutes, and more preferably 10 to 50 mL/minutes.

The melt volume rates of the cycloolefin resin and the resin composition can be measured by the method described in Examples.

Such a resin composition having excellent melt fluidity can be efficiently obtained by using the hydrogenated styrene-based thermoplastic elastomer having a relatively low molecular weight.

In addition, generally, when a hydrogenated styrene-based thermoplastic elastomer having a relatively low molecular weight is added to a cycloolefin resin, its transparency has a tendency to decrease, but the problem of the transparency can be easily solved by combining and using at least two hydrogenated styrene-based thermoplastic elastomers in the present invention.

The flow length of the resin composition according to one embodiment of the invention when being evaluated by the method described in Examples is preferably 300 mm or longer, and more preferably 300 to 550 mm.

In the resin composition according to one embodiment of the invention, a difference ($\Delta$nD) between a refractive index of the cycloolefin resin (nD1) and an average refractive index of the hydrogenated styrene-based thermoplastic elastomers (nD2) is preferably more than −0.002 to less than +0.002.

Since the resin composition in which the difference in the refractive index ($\Delta$nD) is within the above range exhibits more excellent transparency, such a resin composition is suitably used as a forming material for resin formed article such as a drug container and a medical instrument.

The resin composition according to one embodiment of the invention is formed into a sheet with a thickness of 1.0 mm to prepare a specimen, and a total light transmittance of this specimen is, when measured in accordance with JIS K7105, preferably 90.0% or higher.

Furthermore, a haze of this specimen, when being measured in accordance with JIS K7105, is preferably 10.0% or lower.

The resin composition according to one embodiment of the invention, when being subjected to a Charpy impact test according to the method described in Examples, preferably has a Charpy impact strength of 3.0 kJ/m$^2$ or higher.

The resin composition according to one embodiment of the invention is preferably used as a forming material for the resin formed article such as a drug container and a medical instrument since it exhibits excellent transparency, impact resistance and melt fluidity.

[Resin Formed Article]

The resin formed article according to one embodiment of the invention is obtained by forming the resin composition described above.

The resin formed article according to one embodiment of the invention may be produced using an arbitrary forming method. Examples of the forming method include an injection forming method, a press forming method, an extrusion forming method, a blow forming method, and the like.

The melting temperature employed during forming differs depending on the resin composition to be used, but is normally 200 to 400° C., and preferably 210 to 350° C. When a die is used, the die temperature is normally 20° C. to (Tg+15°) C., preferably (Tg−30°) C. to (Tg+10°) C., and more preferably (Tg−20°) C. to (Tg+5°) C., where the glass transition temperature of the resin composition is defined as Tg (° C.).

Since the resin formed article according to one embodiment of the invention can be obtained by using the resin composition having excellent formability and also has excellent transparency and impact resistance, the article is preferably used in the medical field or the like.

Examples of the resin formed article according to one embodiment of the invention include containers such as a drug container, a cosmetic container and a food container; a medical instrument such as a disposable syringe, a prefilled syringe, a vial, an eye drop container, a medical examination cell, an infusion bag, a surgical knife, forceps and a liquid supply tube; an experimental instrument such as a Petri dish, a culture vessel and a disposable pipette; and the like.

EXAMPLES

The invention is further described below by way of examples and comparative examples in detail. Note that the invention is not limited to the following examples. Hereinafter, the units "parts" and "%" used in connection with the examples and the comparative examples respectively refer to "parts by weight" and "wt %" unless otherwise indicated.

The properties mentioned in the examples and the comparative examples below were measured as described below.

(1) Weight Average Molecular Weight (Mw)

The weight average molecular weights (Mw) of the cycloolefin resins and the hydrogenated styrene-based thermoplastic elastomers were measured as standard polyisoprene-equivalent values determined by gel permeation chromatography (GPC) using cyclohexane as a solvent.

Measuring apparatus: HLC8120GPC manufactured by Tosoh Corporation

Column: Three columns, TSKgel G5000HXL, TSKgel G4000HXL, TSKgel G2000HXL manufactured by Tosoh Corporation were connected in series for use.

Standard polyisoprene: Standard polyisoprene manufactured by Tosoh Corporation, Mw=602, 1390, 3920, 8050, 13800, 22700, 58800, 71300, 109000, 280000

Flow rate: 1.0 mL/minute
Volume of injected sample: 100 μL
Temperature of column: 40° C.

(2) Melt Volume Rate (MVR)

The melt volume rate (MVR) was measured at a load of 21.18 N, at 260° C. in accordance with JIS K 7210.

(3) Refractive Index

The refractive indexes of the cycloolefin resin and the hydrogenated styrene-based thermoplastic elastomer were measured in accordance with JIS K7142 as described below.

That is, the cycloolefin resin and the like were melted and kneaded using a LABO PLASTO MILL (manufactured by Toyo Seiki Seisaku-sho, Ltd.) set to 200° C., and then press-formed at 200° C. to obtain a specimen. For this specimen, a refractive index (nD) at a wavelength of sodium D-ray was measured using Abbe's refractometer (2T, manufactured by ATAGO CO., LTD.).

(4) Total Light Transmittance

The resin composition was injection-formed under conditions of a resin temperature of 270° C. and a die temperature of 90° C. using an injection molding machine (ROBOSHOTα100B, manufactured by FANUC CORPORATION) to prepare a specimen of 55 mm length×90 mm width×1 mm thickness.

Subsequently, for this specimen, a total light transmittance was measured using a turbidimeter (NDH-300A, manufactured by NIPPON DENSHOKU INDUSTRIES Co., LTD) in accordance with the method of JIS K7105.

(5) Haze

For the specimen used in the measurement of the total light transmittance, a haze was measured using the turbidimeter (NDH-300A, manufactured by NIPPON DENSHOKU INDUSTRIES Co., LTD) in accordance with the method in JIS K7105.

(6) Charpy Impact Test

A specimen (80 mm×10 mm×4.0 mm) was formed using the injection molding machine (ROBOSHOTα100B, manufactured by FANUC CORPORATION) in accordance with ISO179-1:2000. A notch was formed in each of the five resulting specimens so that 8 mm notch was left, and the Charpy impact strength was measured in accordance with ISO179.

The value calculated by dividing the resulting impact strength by the product of the thickness and the width of the specimen was defined as Charpy impact strength.

(7) Evaluation of Flow Length

Injection molding was carried out at a cylinder temperature of 290° C., a die temperature of 100° C., an injection pressure of 80 MPa, an injection speed of 40 mm/s, a screw rotation of 50 rpm and a back pressure of 0 MPa using the injection molding machine (ROBOSHOTα100B manufactured by FANUC CORPORATION) and a spiral flow die with a thickness of 3 mm and a width of 5 mm, and a flow length L (mm) was determined to evaluate the flow length. Note that an average value of five measurement values was used for the flow length.

Production Example 1

A reactor was charged with 500 parts of dehydrated cyclohexane, 0.82 parts of 1-hexene, 0.15 parts of dibutyl ether, and 0.30 parts of triisobutylaluminum at room temperature under a nitrogen atmosphere, and the whole content was mixed. Then, 76 parts of tricyclo[4.3.0.1$^{2,5}$]deca-3,7-diene (trivial name: dicyclopentadiene, hereinafter abbreviated as "DCP"), 70 parts of 8-methyl-tetracyclo[4.4.0.1$^{2,5}$.1$^{7,10}$]dodeca-3-ene (hereinafter abbreviated as "Me-TCD"), 54 parts of tetracyclo[7.4.0.0$^{2,7}$.1$^{10,13}$]trideca-2,4,6,11-tetraene (hereinafter abbreviated as "MTF") and 80 parts of tungsten hexachloride (0.7% toluene solution) were further continuously added dropwise to the mixture at 45° C. respectively over 2 hours to effect a ring-opening polymerization reaction.

Subsequently, the ring-opening polymerization reaction was terminated by adding 1.06 parts of butyl glycidyl ether and 0.52 parts of isopropyl alcohol to the reaction mixture. The polymerization conversion ratio of each monomer determined by analyzing the reaction mixture by gas chromatography was 99.5%.

270 parts of cyclohexane was added to 100 parts of the resulting reaction mixture. Furthermore, 5 parts of nickel catalyst supported on diatomaceous earth as a hydrogenation catalyst (nickel content: 58 wt %, pore volume: 0.25 mL/g, specific surface area: 180 m$^2$/g) was added to the resulting mixture, and hydrogen was introduced into the system until the pressure reached 5 MPa (G). A hydrogenation reaction was then effected at 200° C. for 8 hours with stirring.

Then, after filtering the reaction mixture to remove the hydrogenation catalyst, cyclohexane and other volatile components were removed from the filtrate at 270° C. under a pressure of 1 kPa or less using a cylindrical evaporator (manufactured by Hitachi Ltd.) to obtain a hydrogenated ring-opening polymer (cycloolefin resin (1)).

Subsequently, the cycloolefin resin (1) was extruded in a molten state in the shape of a strand using a melt extruder, cooled, and pelletized.

The resulting pellets were analyzed, and it was found that the hydrogenation rate achieved by the hydrogenation reaction was 99.8%, and the cycloolefin resin (1) had a weight average molecular weight (Mw) of 33,000, a glass transition temperature (Tg) of 135° C., a specific gravity of 1.01 g/cm$^3$, a refractive index of 1.535 and a melt volume rate of 7.3 mL/10 minutes.

Production Example 2

258 L of cyclohexane was put into an autoclave, to which bicyclo[2.2.1]hept-2-ene (hereinafter referred to as "NB") (120 kg) was further added at normal temperature and in a nitrogen stream, and the whole content was stirred for 5 minutes. Thereto, triisobutylaluminum was added so that its concentration in the system was 1.0 mL/L, and then ethylene was introduced into the autoclave at normal pressure while stirring the whole content. Then, the temperature in the autoclave was increased to 70° C., and ethylene was introduced so that the internal pressure was 0.59 MPa (G) while maintaining this temperature.

After stirring the whole content for 10 minutes, 0.4 L of toluene solution containing isopropylidene (cyclopentadienyl) (indenyl) zirconium dichloride and methylalumoxane was added to start the copolymerization reaction of ethylene with NB.

Note that the concentration of isopropylidene (cyclopentadienyl) (indenyl) zirconium dichloride in the reaction system was 0.018 mmol/L, and the concentration of methylalumoxane was 8.0 mmol/L.

In the copolymerization reaction, ethylene was continuously fed into the autoclave to maintain the temperature at 70° C. and the internal pressure at 0.59 MPa (G). After 60 minutes from start of the reaction, the copolymerization reaction was terminated by adding isopropyl alcohol to the reaction solution. After depressurization, the reaction solution was taken out, this solution was brought into contact with a diluted hydrochloric acid (prepared by diluting 5 L of concentrated hydrochloric acid with 1 m³ of water) of the same volume as this solution under vigorous stirring, and the catalyst residue was transferred to the aqueous phase. This contact mixture was allowed to stand and then, after removal of the aqueous phase, the organic phase was washed with water twice.

This organic phase was brought into contact with 3 times its volume of acetone under vigorous stirring to precipitate the copolymer and the like, and then the precipitate was collected by filtration and washed with acetone. This precipitate was introduced into acetone so that the concentration of the precipitate was 40 kg/m³, was heated at 60° C. for 2 hours, and then, unreacted monomers contained as impurities were extracted. After the extraction, the solid content was collected by filtration and dried at 130° C. and 45 kPa for 12 hours in a nitrogen stream to obtain an ethylene/NB copolymer (cycloolefin resin (2)).

As a result of analyzing the resulting pellets, the weight average molecular weight (Mw) of the cycloolefin resin (2) was 71,000, the glass transition temperature (Tg) was 138° C., the refractive index was 1.534, and the melt volume rate was 13.2 mL/10 minutes.

The compounds used in examples are as follows.

Thermoplastic elastomer (1): Tuftec H1043, manufactured by Asahi Kasei Chemicals Corporation, weight average molecular weight: 28,000

Thermoplastic elastomer (2): SEPTON 2104, manufactured by KURARAY CO., LTD., weight average molecular weight: 40,000 Thermoplastic elastomer (3): KRATON MD1537, manufactured by Kraton Corporation, weight average molecular weight: 80,000

Thermoplastic elastomer (4): Tuftec H1051, manufactured by Asahi Kasei Chemicals Corporation, weight average molecular weight: 54,000

Thermoplastic elastomer (5): SEPTON 2002, manufactured by KURARAY CO., LTD., weight average molecular weight: 37,000

Thermoplastic elastomer (6): KRATON A1536, manufactured by Kraton Corporation, weight average molecular weight: 88,000

Antioxidant (1): pentaerythritol tetrakis [3-(3,5-di-t-butyl-4-hydroxyphenyl)propionate]

Example 1

80 parts of cycloolefin resin (1) obtained in Production Example 1, 13.5 parts of thermoplastic elastomer (1), 6.5 parts of thermoplastic elastomer (5) and 0.3 part of antioxidant (1) were mixed using a blender. Subsequently, the mixture was kneaded using a twin-screw mixer in which the hopper had been replaced by nitrogen at a cylinder temperature of 255° C. and extruded, and this mixture was pelletized to obtain the resin composition (1).

The resin composition (1) was subjected to various measurements. The results are shown in Table 1.

Examples 2 and 3, and Comparative Examples 1 to 6

Resin compositions (2) to (9) were obtained in the same manner as in Example 1 except that the composition was changed as shown in Table 1, and these resin compositions were subjected to various measurements. The results are shown in Table 1.

TABLE 1

|  |  | Example | | | Comparative Example | | | | | |
| --- | --- | --- | --- | --- | --- | --- | --- | --- | --- | --- |
|  |  | 1 | 2 | 3 | 1 | 2 | 3 | 4 | 5 | 6 |
| Compounding ratio (parts) | Cycloolefin resin (1) (Mw: 33000, nD: 1.535) | 80 | 60 | — | 100 | — | 80 | — | 80 | 80 |
|  | Cycloolefin resin (2) (Mw: 71000, nD: 1.534) | — | — | 80 | — | 100 | — | 80 | — | — |
|  | Thermoplastic elastomer (1) (Mw: 28000, nD: 1.549) | 13.5 | 27 | 13 | — | — | — | — | 9 | — |
|  | Thermoplastic elastomer (2) (Mw: 40000, nD: 1.546) | — | — | — | — | — | — | — | — | 14.5 |
|  | Thermoplastic elastomer (3) (Mw: 80000, nD: 1.541) | — | — | — | — | — | 15 | 14.4 | — | — |
|  | Thermoplastic elastomer (4) (Mw: 54000, nD: 1.521) | — | — | — | — | — | — | — | 11 | — |
|  | Thermoplastic elastomer (5) (Mw: 37000, nD: 1.504) | 6.5 | 13 | 7 | — | — | — | — | — | 5.5 |
|  | Thermoplastic elastomer (6) (Mw: 88000, nD: 1.517) | — | — | — | — | — | 5 | 5.6 | — | — |
|  | Antioxidant (1) | 0.3 | 0.3 | 0.3 | 0.3 | 0.3 | 0.3 | 0.3 | 0.3 | 0.3 |
| Melt volume rate (mL/10 min.) | | 10.2 | 17.3 | 17.7 | 7.3 | 13.2 | 5.5 | 9.2 | 6.6 | 6.9 |
| Refractive index of resin composition | | 1.534 | 1.534 | 1.533 | — | — | 1.535 | 1.534 | 1.534 | 1.534 |
| Difference in refractive index [ΔnD] | | 0.000 | 0.000 | 0.001 | — | — | 0.000 | 0.000 | 0.001 | 0.000 |
| Total light transmittance (%) | | 90.8 | 90.2 | 90.3 | 91.4 | 91.3 | 90.6 | 90.1 | 90.8 | 90.6 |

TABLE 1-continued

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Haze (%) | 1.6 | 2.7 | 1.9 | 0.3 | 0.5 | 3.9 | 2.8 | 2.0 | 1.2 |
| Charpy impact test (kJ/m$^2$) | 12 | 30 | 3.1 | 2.0 | 1.7 | 13 | 2.5 | 13 | 14 |
| Evaluation of flow length (mm) | 350 | 500 | 500 | 290 | 410 | 200 | 290 | 260 | 280 |

The following results were confirmed from Table 1.

The resin compositions of Examples 1 to 3 have sufficient transparency and exhibit enhanced impact resistance and melt fluidity compared with the cycloolefin resins constituting the resin compositions, respectively.

On the other hand, Comparative Examples 1 and 2 show results of the cycloolefin resin alone, and exhibit excellent transparency but poor impact resistance.

In addition, although the resin compositions of Comparative Examples 3 to 6 include hydrogenated styrene-based thermoplastic elastomers, the compositions exhibit lowered melt fluidity compared with the cycloolefin resins constituting the resin compositions, respectively.

The invention claimed is:

1. A resin composition comprising a cycloolefin resin and at least two hydrogenated styrene-based thermoplastic elastomers,
wherein a content of the cycloolefin resin is 50 to 90 wt % based on a total amount of the cycloolefin resin and the hydrogenated styrene-based thermoplastic elastomers, and
a melt volume rate of the resin composition at 260° C. is higher than that of the cycloolefin resin at 260° C.

2. The resin composition according to claim 1, wherein both weight average molecular weights of the hydrogenated styrene-based thermoplastic elastomers are 40,000 or less.

3. The resin composition according to claim 1, wherein a difference (ΔnD) between a refractive index of the cycloolefin resin (nD1) and an average refractive index of the hydrogenated styrene-based thermoplastic elastomers (nD2) is more than −0.002 to less than +0.002.

4. A resin formed article obtained by forming the resin composition according to claim 1.

* * * * *